United States Patent [19]
Niederrer

[11] 3,807,555
[45] Apr. 30, 1974

[54] EGG GRADING EQUIPMENT

[76] Inventor: Otto C. Niederrer, Bear Tavern Rd., Titusville, N.J.

[22] Filed: Apr. 9, 1973

[21] Appl. No.: 348,971

[52] U.S. Cl. ............................................. 209/121
[51] Int. Cl. ........................................... B07b 13/08
[58] Field of Search ................... 209/73, 74 R, 121

[56] References Cited
UNITED STATES PATENTS
2,246,597  6/1941  Niederer ............................. 209/121
3,672,501  6/1972  Niederer ............................. 209/121

Primary Examiner—Richard A. Schacher
Attorney, Agent, or Firm—Sperry & Zoda

[57] ABSTRACT

Equipment for grading eggs by weight is provided with a plurality of weighing devices each having a balance beam with egg supporting means thereon. An actuator is positioned to engage an element on the weighing device to positively tilt the balance beam and discharge an egg therefrom in response to limited tilting of the balance beam during the weighing operation due to border-line eggs whereby the weighing operation is speeded up and the damage to eggs is reduced. The accuracy of the weighing operation is also increased. Improved counting means also provided for indicating the number of eggs of each size which has been graded.

15 Claims, 6 Drawing Figures

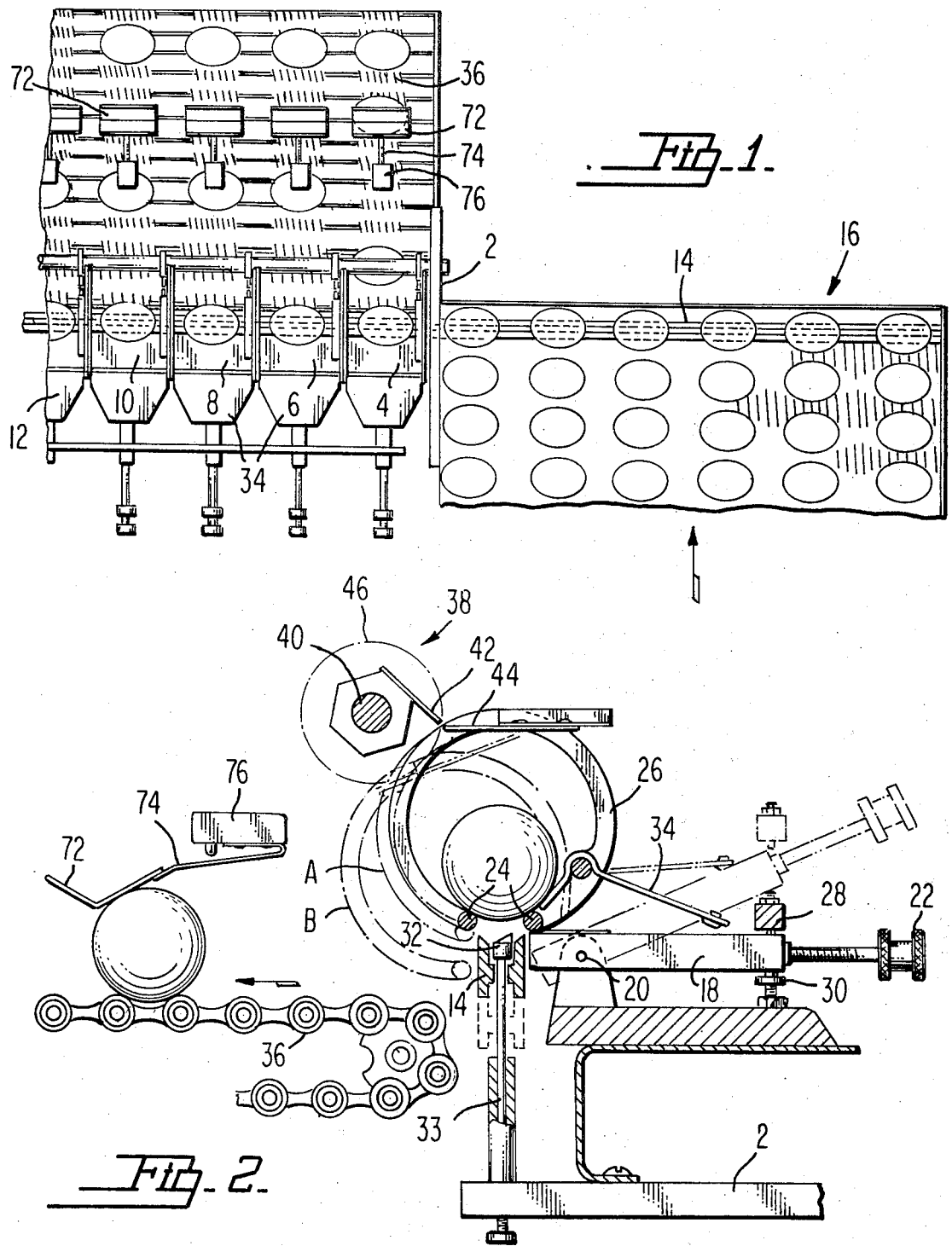

EGG GRADING EQUIPMENT

FIELD OF INVENTION

In the grading of eggs by weight it is usual to provide a series of weighing devices each having a balance beam adjusted to respond to a progressively decreasing weight. The eggs to be graded then are advanced from one weighing device to another until they reach a device which will tilt or respond in a manner to discharge the egg therefrom. See for example U.S. Pat. Nos. 2,246,597 and 2,692,133.

It is found in practice that the weighing devices tend to respond differently to eggs of substantially the same weight but which differ in shape. Thus the center of gravity of a small egg or a long narrow egg when deposited on the egg supports of a weighing device may be located in a different position than that of a nearly spherical egg and as a result the balance beam may tilt more rapidly or more slowly depending upon the shape of the egg. There also are eggs of border-line weight which cause the balance beam to tilt very slowly delaying their discharge from the weighing device with the result that eggs may be picked up and advanced to the next weighing device before they can be discharged. The duration and accuracy of the weighing operation is accordingly quite variable and it has been necessary heretofore to allow sufficient time to elapse between successive weighing operations to assure tilting of the balance beam through a relatively large angle to assure the discharge of all eggs of a predetermined weight from the weighing devices. The speed of operation of the equipment and the egg grading capacity thereof has therefore been limited.

Various means have been provided heretofore for aiding in the discharge of articles from the weighing devices as exemplified by U.S. Pat. No. 2,646,168 and No. 3,672,501. Nevertheless, the discharge of the eggs, even with such assisting means, is not positive and still requires the balance beam to tilt through a relatively large angle in order to effect the discharge of eggs therefrom.

A further difficulty is presented when a group of weighing devices are provided for each weight class to increase the capacity of the equipment and counting means are employed to register the number of eggs of each weight class which have been graded. It is thus found that all weighing devices of any group may not discharge the eggs therefrom simultaneously with the result that prior counting means are actuated irregularly and are sometimes inaccurate in the count registered. Therefore counting and registering means required under such conditions have heretofore been of a complicated and expensive type.

In accordance with the present invention these objections and limitations inherent in prior egg grading equipment are overcome and means are provided for positively actuating the weighing devices to discharge eggs therefrom upon initial tilting of any balance beam through a very limited angle. As a result the time required to complete each weighing operation is reduced, the accuracy of the weighing operation is increased and the speed of operation of the equipment and its egg grading capacity are materially increased. Furthermore, the accuracy of the counting means provided is improved and simplified counting means can be employed.

These results are preferably attained by providing actuating means responsive the limited movement of the weighing device for positively tilting the balance beam through a sufficient angle to assure the discharge of an egg therefrom.

THE DRAWINGS

FIG. 1 is a plan view illustrating a portion of typical egg grading equipment embodying the present invention;

FIG. 2 is a side elevation of one of the weighing devices and actuating means of the equipment shown in FIG. 1;

PREFERRED EMBODIMENT OF THE PRESENT INVENTION

Figure 3:
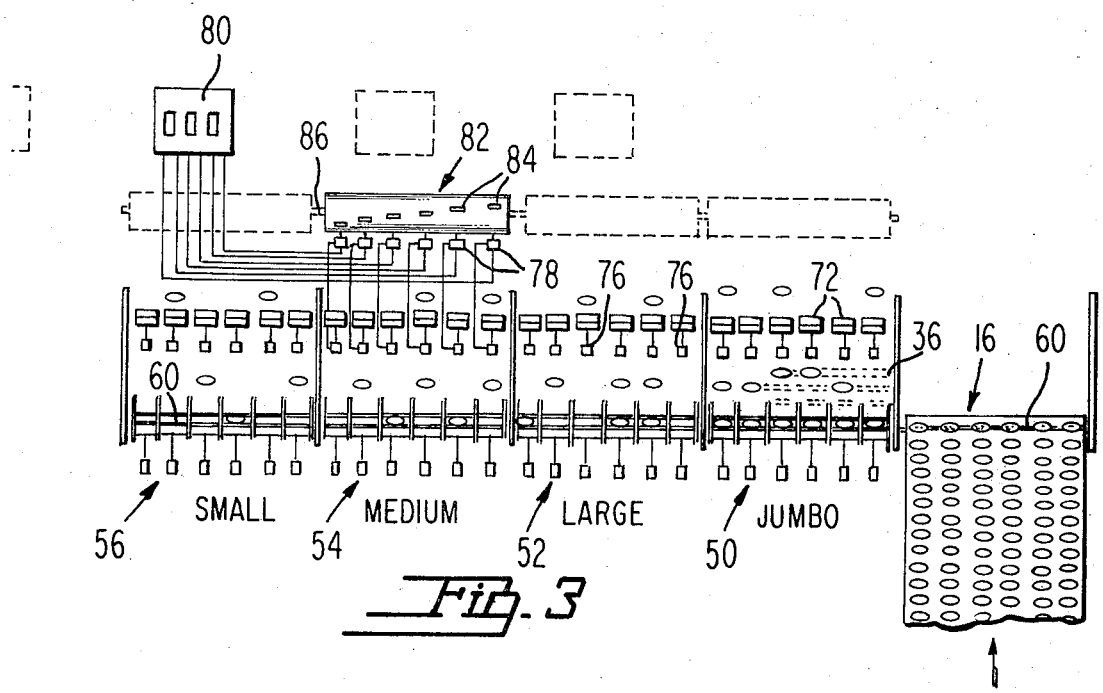
FIG. 3 is a diagrammatic plan view of a portion of a large capacity egg grading device embodying the features of the present invention.

In that form of the invention chosen for purposes of illustration in FIGS. 1, 2, and 3 of the drawings, the equipment is provided with a base 2 upon which a plurality of weighing devices 4, 6, 8, 10, 12, etc., are mounted in a row extending parallel to an egg transfer bar 14. The egg transfer bar 14 is employed to move the eggs to be graded from a loading station 16 to the first weighing device 4 and thereafter serves to advance the eggs successively to each of the other weighing devices 6, 8, 10 and 12 throughout the length of the equipment. The transfer bar is moved longitudinally and raised and lowered so as to travel in an eliptical, rectangular or cyclic path as shown and described in the U.S. patents cited above. The weighing devices also are of the types shown in said patents and each include a balance beam 18 tiltable about pivot means 20 and adjusted to respond to a selected predetermined weight by a counter weight 22 on the outer end of the balance beam.

The opposite or inner end of the balance beam 18 is provided with spaced egg supporting rails 24 connected by loops 26 so that the egg transfer bar 14 may move upward and downward and longitudinally between the rails 24 to advance the eggs from one weighing device to another along the equipment. Locking means 28 are engageable with the weighted outer end of the balance beam to hold it in engagement with a stop member 30 whereby the rails 24 and held in a predetermined position until the transfer bar 14 has moved downward away from the rails 24 and an egg thereby deposited on the rails has ceased to rock or move and has come to rest on the rails. The locking means 28 is then moved in timed relation to the movement of the transfer bar to release the balance beam so that it may tilt under the weight of an egg of predetermined weight after the transfer bar moves downward.

An ejector bar 32 is preferably located within the upwardly facing channel of the transfer bar 14 and held in a predetermined position by a rod 33 during downward movement of the transfer bar after an egg has been deposited on the rails 24 of the weighing device. Upon tilting of the balance beam the egg resting on the rails 24 will engage the ejector bar 32 so as to be discharged from the weighing device as described more fully in U.S. Pat. No. 2,646,168 referred to above. Further, if desired, the weighing device may be provided with egg stabilizing means 34 of the type disclosed in U.S. Pat. No. 3,672,501.

In accordance with the present invention actuating means 38 are provided for positively tilting the balance beams of such weighing devices upon initial and limited tilting thereof. In this way the eggs of each predetermined weight class are positively discharged from the weighing devices onto a take-away conveyor 36 or the like without the delays incident to the slow or gradual tilting of the balance beams. Moreover, all eggs will be discharged simultaneously from the weighing devices.

As shown in FIG. 2, such actuating means preferably are located on the end of the pivot 20 for the balance beam 18 remote from its counter weight 22 and are normally spaced from the weighing device so that it will not influence the weighing operation. The actuating means illustrated includes a rotatable shaft 40 having a finger 42 projecting therefrom for cooperation with an arm or projection 44 mounted on the weighing device. The end of finger 42 is moved through an arc as indicated in dotted lines at 46 upon rotation of the shaft 40. The arm 44 attached to the weighing device is preferably mounted on one of the loops 26 by which the egg supporting rails 24 are connected to the balance beam 18. The arm 44 is positioned so that when the balance beam 18 and rails 24 are held in a locked position to receive and support an egg to be weighed, the free end of the arm 44 will be spaced a short distance from the arc 46 representing the path of travel of the free end of finger 42 as shown in full lines in FIG. 2. However, when the balance beam is thereafter released by upward movement of locking means 28 to initiate a weighing operation, tilting of the balance beam 18 through a very limited angle to a position as indicated by the dotted lines A in FIG. 2, will cause the free end of arm 44 on loop 26 to move into the path of movement of the free end of finger 42. Arm 44 will then be engaged by the finger 42 of the actuating means to positively tilt the balance beam and rails 24 through a sufficient angle to assure prompt discharge of the egg from the weighing device as shown in dotted lines at B in FIG. 2. The finger 42 and arm 44 are preferably formed of yieldable or spring material to prevent shock or vibration of the elements upon contact. Accordingly, as soon as tilting movement of the balance beam has been initiated the actuating means will operate to positively tilt the balance beam to promptly discharge the egg onto take-away conveyor 36. In this way even very limited tilting or slow tilting of the balance beams with a border line weight egg will nevertheless assure proper and effective discharge of the egg onto the egg take-away conveyor without the delays formerly encountered in such cases.

The timed relation in the movements of the egg conveying bar 14, locking means 28 and actuating means 38 assures sequential operation thereof so that it is possible to eliminate the danger of movement of the egg conveying bar 14 upward against an egg supported on a partially tilted balance beam in a manner to strike and damage an egg resting on the rails 24. Checking and damage to the eggs being weighed is therefore reduced and the accuracy of the weighing operation is increased.

The present invention further permits a substantial increase in the egg grading capacity of the equipment. Thus, as shown diagrammatically in FIG. 3 the weighing devices can be arranged in groups with, say six, weighing devices adjusted to respond to the same weight in each group. Five or more such groups of weighing devices adjusted to respond to eggs of different weight may then be provided, four of which are shown at 50, 52, 54 and 56 in FIG. 3. The egg transfer bar 60 is correspondingly lengthened to receive and advance six eggs at a time to each group or say thirty eggs in each cycle of operation. The longitudinal distance of movement of the transfer bar in each cycle is then increased to move the eggs from one weighing device past the other devices in any group to a corresponding position in the next group of devices. Thus in a typical installation wherein there are six weighing devices in each group, the transfer bar may move longitudinally a distance of three feet or more in each direction while moving up and down through as many as 40 or 50 cycles per minute. The longitudinal speed at which the eggs are advanced between weighing operations will then be about 400 to 500 feet per minute. As a result there is a tendency for the eggs to rock or be displaced longitudinally of the transfer bar at the end of the advancing movement of the bar and as it moves downward to lower the eggs onto the egg supporting rails of the weighing devices.

Figure 4:
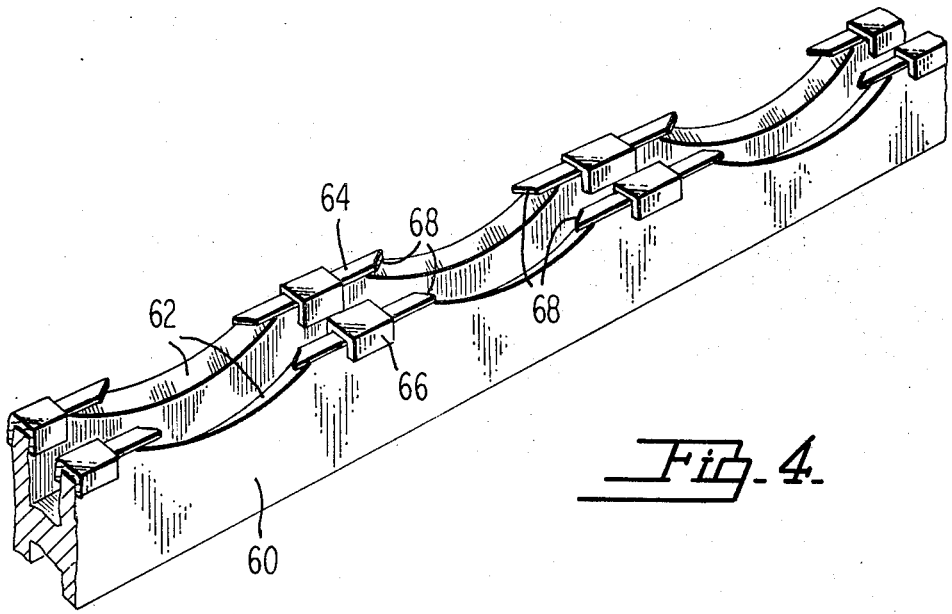
FIG. 4 is a perspective showing a portion of the transfer means used in transferring the eggs from one weighing device to another.

In order to prevent such movement of the eggs on the transfer bar 60, and as shown in FIG. 4, the transfer bar is preferably provided with egg receiving recesses 62 and anti-friction and cushioning elements are located between the recesses 62 in position to contact the eggs and retain them in place on the transfer bar 60 during movement of the eggs from one group of weighing devices to another. For this purpose yieldable rubber or plastic strips 64 are mounted on the bar 60 by means of metal clips 66 and present inclined ends 68 at opposite ends of adjacent recesses 62 in the transfer bar. The eggs are therefore yieldably but firmly supported against longitudinal or rocking or other movement on the transfer bar so as to be lowered and deposited on the rails 24 of the weighing devices in a stable and predetermined position assuring accurate weighing thereof.

With the equipment described above all of the eggs falling into each predetermined weight class for which the weighing devices of any group have been adjusted will be accurately weighed and simultaneously discharged from the weighing devices onto a take-away conveyor 36 or the like. It is then possible to use simplified counting means for determining and registering the number of eggs of each grade or weight class which have been graded by the equipment.

Figure 5:
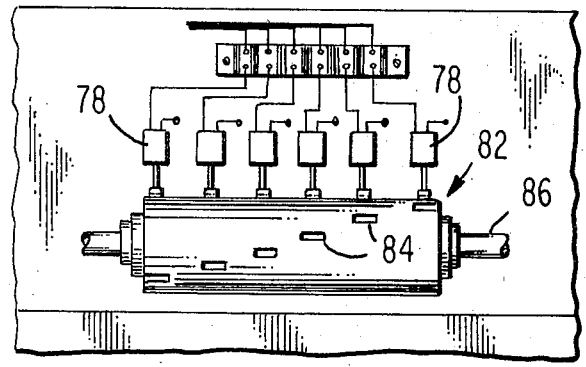
FIG. 5 is a perspective illustrating a sequence mechanism for actuating counting elements.

As shown in FIGS. 5, and illustrated in FIGS. 1, 2, and 3, the egg counting means includes a feeler 72 associated with each weighing device and disposed above the take-away conveyor 36 in position to be contacted by an egg discharged from a weighing device. There are thus six feelers for each group of the egg weighing devices 50, 52, etc. shown in FIGS. 3. The feelers 72 are each secured to an arm 74 and are designed to actuate egg responsive micro-switches 76 when engaged by an egg on the conveyor 36. Each egg responsive micro-switch 76 is in turn connected electrically to a counter actuating micro-switch 78 so that when both of the micro-switches 76 and 78 are closed, current will be supplied to a counter 80 to register the discharge of an egg of a particular size from the grading equipment.

Figure 6:
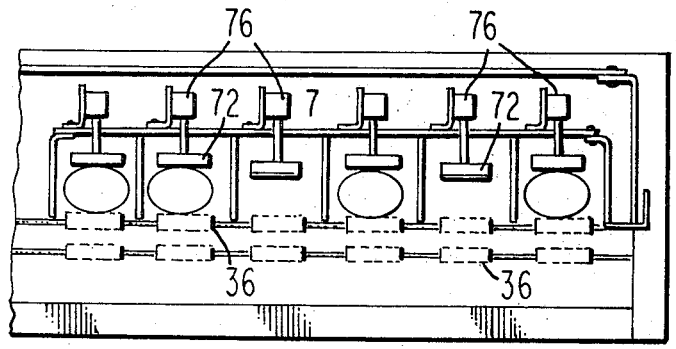
FIG. 6 is a front elevation showing a portion of the discharge side of the equipment illustrated in FIGS. 1 and 3.

One counter 80 is provided for each group of weighing devices 50, 52, etc., so as to register the number of eggs of each weight class included in any lot of eggs being graded. The various micro-switches 78 associated with any group of weighing devices are normally open but are closed one after the other by sequencing means such as that shown in FIGS. 3 and 6. For this purpose the counter actuating micro-switches 78 are mounted adjacent to a rotatable drum 82 having elements 84 arranged thereon in circumferentially spaced relation. The drum 82 is rotated by a shaft 86 in timed relation with the movement of the take-away conveyor 36. The feelers 72 engaged by the eggs are so formed as to hold the egg responsive micro-switch 76 closed until the drum 82 has made a single revolution to sequentially close each of the counter actuating micro-switches 78. In this way, the number of electrical impulses passing to each counter 80 to actuate the same will correspond with the number of eggs of one particular size discharged from the grading equipment and engaging a feeler 72 to close a switch 76 during each cycle of operation of the equipment. Furthermore, such impulses will be impressed on the counters 80 successively so that even though two, three or even six eggs of the same weight are discharged in any cycle of operation of the grading device, the counter 80 will receive the correct number of impulses to assure accurate counting of the eggs.

It has been found in practice that equipment embodying the present invention can be operated at a rate to grade from 80 to 90 cases of eggs an hour while increasing the accuracy of the grading and counting operations and decreasing the checking and damage to the eggs being handled.

While the invention has been shown and described herein with reference to particular constructions of the prior art, it should be understood that the form, construction, and arrangement of the various elements of the combination are capable of numerous changes and substitutions without departing from the teaching of the present invention. Accordingly, the particular embodiment of the invention illustrated in the drawings and described above is intended to be considered as illustrative only.

I claim:

1. Equipment for grading eggs by weight including a series of weighing devices arranged along a path and adjusted to respond to progressively different weights, each of said weighing devices having a balance beam with egg supporting means thereon, means for moving eggs along said path from the egg supporting means of one weighing device to the egg supporting means of another weighing device, actuating means located adjacent said weighing devices, and cooperating elements on said actuating means and weighing devices operable upon limited tilting of the balance beam of any of said weighing devices to discharge an egg from the egg supporting means thereon.

2. Equipment as defined in claim 1 wherein said actuating means serves to positively tilt said balance beam to a position wherein an egg will be discharged from said egg supporting means.

3. Equipment as defined in claim 1 wherein the actuating means is normally spaced from the weighing device but is engageable with an element connected to the weighing device upon limited tilting of the balance beam.

4. Equipment as defined in claim 3 wherein the balance beams of the weighing devices are each tiltable about a pivot and have a counter weight on one side of said pivot and said element on the weighing device engageable by said actuating means is located on the opposite side of said pivot.

5. Equipment as defined in claim 1 wherein said actuating means is operable to effect simultaneous discharge of eggs from all of said weighing devices which tilt in response to the weight of an egg deposited on the egg supporting means thereof by said egg moving means.

6. Equipment as defined in claim 1 wherein said actuating means includes a rotatable member and said balance has an element connected thereto engageable with the rotatable member of the actuating means upon limited tilting of the balance beam.

7. Equipment as defined in claim 1 wherein said weighing devices are provided with locking means movable into and out of engagement with said balance beams in timed relation with said egg moving means to initiate and terminate a weighing operation, and said actuating means is movable in timed relation to said locking means to effect the discharge of an egg from a weighing device only after the weighing operation has been initiated.

8. Equipment as defined in claim 1 wherein said actuating means includes a rotatable shaft located adjacent said weighing devices, cooperating means on said shaft and weighing devices are movable into engagement upon limited tilting of any weighing device, said cooperating means being operable upon engagement to move the weighing devices thus tilted to a position wherein an egg wlll be effectively discharged from the weighing device.

9. Equipment as defined in claim 1 wherein said actuating means includes a rotatable shaft having a finger projecting therefrom and movable in an arcuate path upon rotation of said shaft, and an arm on each weighing device movable into the path of rotation of said finger upon limited tilting of the weighing device to tilt such device far enough to effect the discharge of an egg therefrom.

10. Equipment as defined in claim 1 including counting mechanism comprising an element associated with each weighing device and operable to register the discharge of an egg therefrom.

11. Equipment as defined in claim 1 wherein a sensing element is located adjacent each weighing device and operable upon discharge of an egg therefrom to close a switch, a counting device for registering the number of eggs graded by the equipment, and means for sequentially completing an electrical circuit to said counter through each of the switches closed by said sensing means.

12. Equipment as defined in claim 1 wherein said actuating means and weighing devices are operable in repeated cycles to discharge eggs simultaneously from those weighing devices which have tilted during each cycle of operation, counting means for registering the number of eggs thus discharged including a sensing element associated with each weighing device responsive to the discharge of an egg therefrom, and rotatable means having circumferentially spaced switch actuating means thereon sequentially operable during each of said cycles for transmitting to said counter an impulse from each sensing element which has responded to the discharge of an egg from a weighing device during each cycle of operation of the equipment.

13. Equipment for grading eggs by weight comprising a plurality of weighing devices arranged in side by side relation along a path and each having a balance beam with spaced egg supporting rails connected thereto adjacent one end of the balance beam, counterbalance means on the other end of each balance beam, said counterbalance means being adjusted to cause the weighing devices along said path to respond to progressively decreasing weights, and egg transfer bar movable longitudinally in an eliptical path between the egg supporting rails on the balance beams for raising, advancing, and lowering eggs to deposit the eggs on one of said weighing devices after another, locking means engageable with said balance beams and movable in timed relation to said egg transfer bar to initiate a weighing operation after eggs have been deposited on the egg supporting beams of the weighing devices, actuating means located adjacent said weighing devices, devices normally held in spaced relation by operation of said locking means until a weighing operation has been initiated, and engageable thereafter upon tilting movement of any balance beam during a weighing operation to positively tilt said balance beam to a position in which an egg will be discharged from the egg 14. Equipment as defined in claim 13 wherein there are a plurality of groups of weighing devices arranged along said path with the weighing devices of each group adjusted to respond to the weight of eggs of the same weight class, said egg transfer being formed to receive and move eggs from one of said groups of weighing devices to another, and means on said transfer bar presenting a cushioning anti-friction surface engageable by eggs deposited on said transfer bar for retaining the eggs in place on said bar during movement of the eggs from one group of weighing devices to another.

15. Equipment as defined in claim 13 wherein egg receiving means are located adjacent said weighing devices in position to receive eggs discharged from the weighing devices, and counting means are associated with each group of weighing devices to register the number of eggs of each weight class graded by the equipment during operation thereof.

* * * * *

UNITED STATES PATENT OFFICE
CERTIFICATE OF CORRECTION

Patent No. 3,807,555   Dated April 30, 1974

Inventor(s) Otto C. Niederer

It is certified that error appears in the above-identified patent and that said Letters Patent are hereby corrected as shown below:

The patentee's name "Niederrer" is misspelled. The correct spelling is --Niederer--

Column 7, line 25 after the comma, insert --and cooperating elements on said actuating means and weighing--

Signed and sealed this 8th day of October 1974.

(SEAL)
Attest:

McCOY M. GIBSON JR.
Attesting Officer

C. MARSHALL DANN
Commissioner of Patents